United States Patent
Kammerzell et al.

(10) Patent No.: US 12,440,613 B2
(45) Date of Patent: Oct. 14, 2025

(54) SYSTEM, COMPUTER SYSTEM AND COMPUTER PROGRAM FOR DETERMINING A CARDIOVASCULAR PARAMETER

(71) Applicant: PULSION MEDICAL SYSTEMS SE, Feldkirchen (DE)

(72) Inventors: Sergej Kammerzell, Munich (DE); Mark Konrad, Munich (DE); Maarten Willem Nicolaas Nijsten, Groningen (NL)

(73) Assignee: Pulsion Medical Systems SE, Feldkirchen (DE)

( * ) Notice: Subject to any disclaimer, the term of this patent is extended or adjusted under 35 U.S.C. 154(b) by 916 days.

(21) Appl. No.: 17/427,075

(22) PCT Filed: Jan. 30, 2020

(86) PCT No.: PCT/EP2020/052337
§ 371 (c)(1),
(2) Date: Jul. 29, 2021

(87) PCT Pub. No.: WO2020/157225
PCT Pub. Date: Aug. 6, 2020

(65) Prior Publication Data
US 2022/0096722 A1    Mar. 31, 2022

(30) Foreign Application Priority Data
Jan. 31, 2019 (DE) .................. 102019000730.1

(51) Int. Cl.
*A61M 1/16* (2006.01)
*A61M 1/36* (2006.01)
*G16H 40/63* (2018.01)

(52) U.S. Cl.
CPC ........ *A61M 1/1698* (2013.01); *A61M 1/1617* (2014.02); *A61M 1/3609* (2014.02);
(Continued)

(58) Field of Classification Search
CPC .............. A61M 1/3623; A61M 1/1698; A61M 1/1617; A61M 1/3609; A61M 2205/3368; G16H 40/63
See application file for complete search history.

(56) References Cited

U.S. PATENT DOCUMENTS

| | | | | |
|---|---|---|---|---|
| 4,941,475 A | * | 7/1990 | Williams | ............... A61B 5/028 600/549 |
| 2006/0030917 A1 | * | 2/2006 | Eccleston | ............... A61M 5/44 607/113 |

(Continued)

FOREIGN PATENT DOCUMENTS

| | | |
|---|---|---|
| DE | 102016001710 A1 | 8/2017 |
| WO | 2010014113 A1 | 2/2010 |

OTHER PUBLICATIONS

International Search Report issued in International Application No. PCT/EP2020/052337, mailed on Apr. 23, 2020, 3 pages.

(Continued)

*Primary Examiner* — Guy K Townsend
*Assistant Examiner* — Peter Daniel Smith
(74) *Attorney, Agent, or Firm* — Patterson + Sheridan, LLP; Carleton S. Clauss

(57) ABSTRACT

The invention relates to a system for determining a cardiovascular parameter in a patient, wherein the system is adapted to work in conjunction with an extracorporeal blood treatment device (ECBTD) connectable to a patient's vascular system, wherein the ECBTD comprises a first circuit, the system comprising: a liquid-filled, second circuit thermally connected to the first circuit of the ECBTD via a heat exchanger, temperature changing means for generating a temperature change in the second circuit, temperature sensors TS2up and TS2down arranged in the second circuit upstream and downstream of the heat exchanger, respectively. A computer system connected to the temperature sensors and the temperature changing means is adapted to induce a temperature bolus within the first circuit of the ECBTD via the temperature changing means. From the individual temperature recorded as a function of time, temperature curves T2up(t) and T2down(t) are derived and evaluated.

19 Claims, 1 Drawing Sheet

(52) U.S. Cl.
CPC .......... *A61M 1/3623* (2022.05); *G16H 40/63* (2018.01); *A61M 2205/3368* (2013.01)

(56) References Cited

U.S. PATENT DOCUMENTS

2015/0316404 A1* 11/2015 Krivitski ................ G01F 22/02
              702/19
2017/0224898 A1*  8/2017 Pesenti .................. B01D 61/58

OTHER PUBLICATIONS

Wietasch et al., Bedside assessment of cerebral blood flow by double-indicator dilution technique, Anesthesiology, Feb. 2000, pp. 367-375, vol. 92, No. 2, downloaded from http://pubs.asahq.org/anesthesiology/article-pdf/92/2/367/405439/0000542-200002000-00017.

* cited by examiner

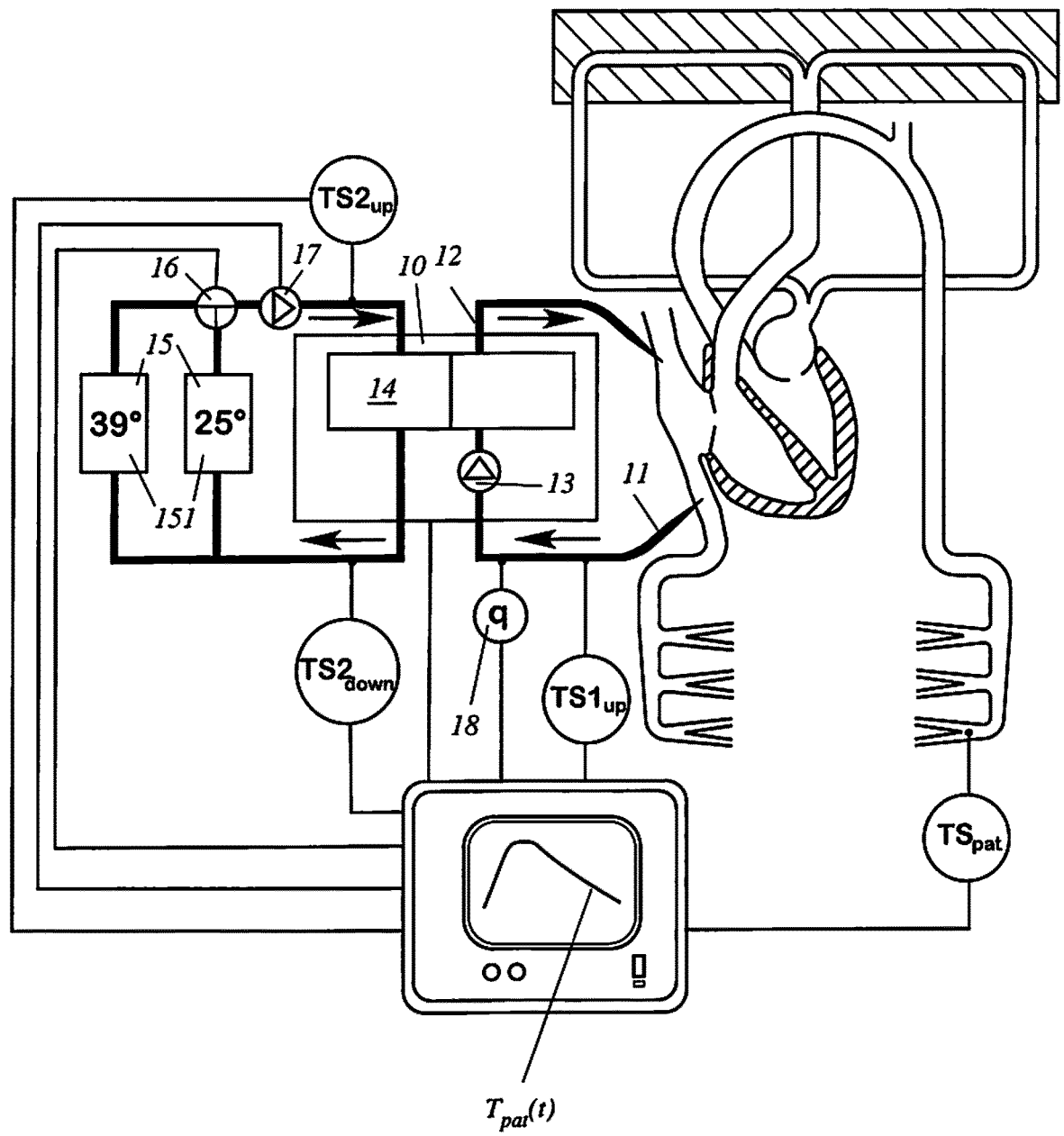

SYSTEM, COMPUTER SYSTEM AND COMPUTER PROGRAM FOR DETERMINING A CARDIOVASCULAR PARAMETER

CROSS-REFERENCE TO RELATED APPLICATION(S)

This application is the United States national phase application of International Application No. PCT/EP2020/052337, filed Jan. 30, 2020, which claims priority under 35 USC 119 to German Patent Application No. 10 2019 000730.1, filed Jan. 31, 2019.

TECHNICAL AREA

The present invention relates to a system for determining a cardiovascular parameter of a patient according to claim 1, a method according to claim 16, a computer system and a computer-readable storage medium according to claims 18 and 19, respectively, wherein the system is adapted to work in conjunction with an extracorporeal blood treatment device.

BACKGROUND OF THE INVENTION

Extracorporeal blood treatment is indicated for a number of conditions in patients, for example, hemodialysis in diseases of the kidney and liver and extracorporeal decarboxylation/membrane oxygenation (ECMO) in the treatment of severe lung disease (acute respiratory distress syndrome, ARDS) and heart failure (myocardial infarction, severe arrhythmias). For example, extracorporeal membrane oxygenation is considered a standard therapy for stabilizing the respiratory function and/or cardiovascular circulation in patients suffering from ARDS with severe, life-threatening hypoxemia. Cannulation of large blood vessels (either arterial or venous) is required for performing ECMO, allowing blood flow between the patient and the ECMO device. Within the device, blood is perfused via a membrane oxygenator, driven by a roller or centrifugal pump, which produces a flow of 2 to 6 l/min. The main part of the membrane oxygenator is the gas exchange membrane, were $O_2$ is added to and $CO_2$ removed from the blood. In many modern oxygenators, the semipermeable gas exchange membrane consists of packed hollow fibers made of polymethylpentene (PMP) with gas flowing inside the fibers and blood flowing outside in a low resistance path, allowing for efficient oxygenation and carbon dioxide elimination. A heat exchanger ensures that oxygenized blood is warmed before being returned to the patient's circulatory system. In some modern oxygenators, a heat exchange system is integrated into the oxygenator system, making it possible to control the temperature of the blood that flows back to the patient without requiring additional components.

Most commonly, the patient's femoral vessels are cannulated for gaining access to the patient's circulatory system. Depending on the underlying disease of the patient, veno-venous, arterio-venous and veno-arterial configurations of the ECMO are possible. In patients with disturbed gas exchange and intact cardiac function, the arterio-venous configuration may be used (avECMO), wherein blood drained from the femoral artery is directed back to the right atrium via the oxygenator. Veno-arterial ECMO (vaECMO) provides complete cardiac support in patients with severe cardiac failure; here, the venous blood is drained from the inferior caval vein, passes the oxygenator and is returned to the patient via the femoral artery or ascending aorta. The most commonly used configuration is veno-venous (vvECMO), providing gas exchange in the case of severe acute respiratory failure (such as ARDS); wherein in a frequently used configuration, the blood flows from the inferior caval vein to the oxygenator and is returned to the patient via the superior caval vein.

Although the method has been used for many decades, prospective randomized trials in ARDS patients, comparing ECMO treatment with conventional treatment, show only marginally improved outcomes in the ECMO treatment group, the overall survival benefit being controversial. It has been postulated that an optimization of the patient's hemodynamic situation prior and during an ECMO treatment allows for a more accurate adjustment of the ECMO settings and improved cardiac function of the patient. In the case of severe respiratory failure and before initiation of a vvECMO therapy, patients may present with high ventilator pressures, decreased venous return, high pulmonary vascular resistance, and poor perfusion with high systemic vascular resistance; on the cardiac level, cardiac output may be reduced due to hypoxemia. Once ECMO is commenced, symptoms may reverse with reduced pulmonary vascular resistance, increased venous return, reduced systemic vascular resistance and improved cardiac output. Thus, close monitoring of hemodynamic function is required but it is challenging in critically ill patients undergoing extracorporeal blood treatment therapy, in particular ECMO therapy. Pulmonary artery catheterization or conventional monitoring using transpulmonary thermodilution (TPTD), e.g. via Picco monitoring, is difficult after ECMO cannulas are in place and may be of limited value. Physiologic markers such as blood pressure, urine output, and extremities examination are valuable data for functional hemodynamic monitoring; they are, however, limited with respect to the required detailed assessment of the hemodynamic situation during ECMO. What is needed is a minimally invasive, reliable technique to provide for continuous monitoring of cardiovascular parameters such as cardiac output during extracorporeal blood treatment therapy, in particular ECMO therapy.

SUMMARY OF THE INVENTION

In a first aspect, the invention relates to a system for determining a cardiovascular parameter in a patient, wherein the system is adapted to work in conjunction with an extracorporeal blood treatment device connectable to a patient's vascular system via an afferent line and an efferent line. As used herein, the singular form of the articles "a", "an" and "the" includes plural references unless indicated otherwise. For example, the phrase "a cardiovascular parameter" includes one or more cardiovascular parameters. The system is arranged to determine the cardiovascular parameter in a patient by thermodilution (TD) measurements, preferably by transpulmonary thermodilution. The extracorporeal blood treatment device (ECBTD) may be a hemodialysis device for renal replacement therapy, a device for extracorporeal liver support, or an extracorporeal membrane oxygenator (ECMO)/decarboxylator (ECCO(2)R). In the afferent line (in relation to the ECBTD), blood is drained from the patient and moved towards the ECBTD. For example, in the case of a veno-venous ECMO (vvECMO), a drainage catheter may be placed in the femoral vein and advanced to the inferior caval vein. After treatment, blood is returned to the patient via the efferent line (in relation to the ECBTD); in the exemplary case of a vvECMO, a catheter may be advanced from the other femoral vein to the right atrium, delivering oxygenated blood directly to the right heart circulation. The ECBTD comprises a first circuit with at least one pump in the first circuit arranged between the afferent line and the efferent line for pumping the blood of the patient. The pump is used to control or regulate the passage of blood through the extracorporeal circuit; it must be able to provide flow appropriate for the patient and operate within a safe range of pressures in order to avoid hemolysis. The pump may be of any variety known in the state-of-the-art suitable for an ECBTD, in particular, the pump may be of the roller type or the centrifugal type. Most preferred the pump is a centrifugal pump, providing for either a constant or a variable flow rate through the ECBTD. The system comprises a liquid-filled, second circuit thermally connected to the first circuit of the ECBTD via a heat exchanger. The term "heat exchanger" refers to a device used to transfer heat between two or more fluids, thereby allowing heat exchangers to be used in both cooling and heating processes. In heat exchangers operating by indirect heat transfer, fluids may be separated by a solid interface to prevent mixing or, alternatively, fluids may be in direct contact with each other (direct heat exchange). The heat exchanger according to the invention operates by indirect heat transfer; also in heat exchangers utilized in ECBTDs of the state-of-the-art (often designated as "heating units"), heat is transferred indirectly. The heat exchanger of the present invention transfers thermal energy in between the fluids circulating in the second circuit and in the first circuit of the ECBTD (patient's blood), respectively, via a thermally conductive interface. The heat exchanger may operate in any of the flow arrangements known from the art (e.g., parallel-flow, counterflow, cross-flow, diffuse flow); preferably, the heat exchanger operates as diffuse flow or counter-flow exchanger, where fluids may enter the exchanger from nearly opposite ends. Operation in the diffuse flow or counter-flow mode is the most efficient arrangement, since it allows for the maximum of heat transfer from the heat transfer medium per unit mass due to the fact that the average temperature difference along any unit length is higher. The system further comprises temperature changing means for generating a controlled temperature change in the second circuit. According to the invention, the temperature changing means are adapted to change a temperature of the liquid in the second circuit by the transfer of thermal energy. Thus, the temperature changing means are adapted to provide for an energy change in the second circuit, e.g. in the form of an energy or thermal bolus, an energy or thermal variation around a baseline, an energy or thermal wave etc. Temperature changing means according to the invention may be temperature modulating means. In particular, the temperature changing means in the second circuit are adapted to generate controlled changes in temperature, such as a temperature bolus, i.e. a temperature deviation with steep increase and decrease characteristics in order to achieve a maximum change of temperature in a minimum of time. The temperature changing means may be of any variety known from the prior art, they may comprise a heat source and/or a heat sink, e.g. in the form of a Peltier element or in the form of one or more temperature-controlled, fluid-filled container(s), like one or more a water baths. The temperature change may be in both directions, i.e. colder or warmer or both with respect to blood temperature; preferably, the temperature changing means according to the invention generate a controlled lower temperature in the second circuit. The system further comprises a temperature sensor TS2up arranged in the second circuit upstream of the heat exchanger, and a temperature sensor TS2down arranged in the second circuit downstream of the heat exchanger. The terms "downstream" and "upstream" regarding the arrangement of the temperature sensors in the second circuit refer to the respective direction of flow in the second circuit (and also within the associated part of the heat exchanger). The temperature sensors may be designed as any sensors commonly used for thermodilution measurements, such as platinum resistance sensors or other thermoresistors or thermocouples. The system further comprises a computer system connected to temperature sensors TS2up and TS2down and to the temperature changing means. The computer system is adapted to induce a temperature change within the first circuit of the ECBTD via the temperature changing means. The computer system is controlling or regulating the temperature changing means, which are adapted to generate a temperature change in the second circuit, thereby inducing a temperature change in the first circuit. The heat transfer from the second to the first circuit is accomplished by the heat exchanger, which thermally connects both circuits. The computer system is further adapted to record each temperature as a function of time and to evaluate the respective temperature curves T2up(t) and T2down(t). The evaluation of such temperature curves involves e.g. the evaluation of the baseline, a drift of the baseline, the area under the curve (AUC) and other characteristics known from the state-of-the-art (see, e.g. EP 1 139 867 A1). In the present invention, T2up(t) and T2down(t) are temperature curves derived from the temperature sensors arranged in the second circuit, The computer system is further adapted to compute a relation of T2up(t) and T2down(t)1 in order to determine and control the characteristics of the time-dependent changes in the temperature generated by the temperature changing means, wherein T2down(t)1 is derived from temperature data measured by TS2down. The magnitude of change in temperature in the second circuit will be related to the magnitude of the temperature change induced in the first circuit by the temperature changing means. For example, the difference between T2up(t) and T2down(t)1 relates to the efficiency of heat transfer between the two circuits across the heat exchanging surface of the exchanger and therefore is indicative of the characteristics (magnitude, duration, steepness) of the traveling temperature deviation (e.g. temperature bolus) induced in the first circuit. The computer system is further adapted to determine the cardiovascular parameter of the patient from the relation of T2up(t), T2down(t)2, wherein T2down(t)2 is derived from temperature data measured by TS2down at a second time; for example, the computer system is adapted to determine from said relation a relevant cardiovascular parameter such as the cardiac output. Thus, TS2down serves to detect the temperature signal originating from the patient's vascular system, in addition to detecting the characteristics of the time-dependent changes in the temperature generated by the temperature changing means. The different signals may be resolved with respect to their individual time course, wherein the patient derived signal measured by TS2down arrives at said sensor later than the temperature signal generated by the temperature changing means. Accordingly, in this configuration, at least two different temperature curves may be computed by the computer system from said sensor data, namely T2down(t)1 and TS2down(t)2, the first of which relates to e.g. the temperature bolus generated by the temperature changing means, and the second of which derives from the patient and comprises information about the cardiovascular status of the patient.

It is known from the state-of-the-art that from the thermodilution curves generated by e.g. a Picco system or a pulmonary artery thermodilution catheter various cardiovascular parameters may be derived; cardiac output (CO) may be derived by algorithms based on the Stuart Hamilton equation $$CO = \frac{V_L(T_B - T_{bol})K_1 K_2}{\int \Delta T_B(t)dt},$$

where $T_B$ is the initial blood temperature, $T_{bol}$ is the temperature of the a temperature bolus that is directly administered to the patient's blood and $V_L$ is the volume of the bolus injected into the blood. $K_1$ and $K_2$ are constants reflecting the specific measurement setup and $T_B$ (t) is the blood temperature as a function of time with respect to the baseline blood temperature $T_B$. In the present invention, the cardiac parameter may be determined utilizing a modified version of the Stuart Hamilton equation, thereby taking account of the lack of a volume change induced in the first circuit for generating a temperature bolus, which obviates the function factor $V_L$. Additionally, or alternatively, other mathematical functions may be employed, depending on the characteristics of the temperature change induced by the temperature changing means.

Other parameters derivable directly from the temperature curves known from the state-of-the-art, in particular from thermodilution include the exponential decay or downslope time DST, as well as the mean transit time MTT; from these, different parameters may be calculated, such as the intrathoracic thermal volume ITTV, the global end-diastolic volume GEDV and the extravascular thermal volume ETV. Moreover, even right heart function may be estimated by parameters such as GEDV, cardiac index CI (CO/BSA), or cardiac function index CFI (CO/GEDV) or systemic organ perfusion (Wietasch, G. J., et al., 2000).

The system of the invention relies on the well-established method of thermodilution in order to provide an efficient and reliable way for continuously monitoring the hemodynamic function and for determining cardiovascular parameters in critically ill patients undergoing extracorporeal blood treatment therapy. In the case of ECMO therapy, no additional vascular access is required for applying (repeated) temperature signals such as temperature boluses. Moreover, a configuration employing only temperature sensors TS2up and TS2down provides for a convenient determination of the cardiovascular parameter without requiring additional access to the patient's vascular system (via a peripheral temperature sensor, as required e.g. in Picco TPTD measurements) Likewise, the intermittent additional volume load regularly associated with TD and TPTD is avoided, thereby eliminating a factor potentially contributing to hemodynamic instability or intravascular overfilling in these patients. At the same time, cardiovascular parameters, including parameters relating to right heart function, may be determined with precision, relying on well-established computational methods.

In a further embodiment, the system may additionally comprise a temperature sensor TSpat for measuring the local temperature of the patient's blood at the place of the patient's vascular system downstream of the ECBTD, wherein the computer system may be connected further to TSpat and wherein the computer system may be adapted further to record Tpat as a function of time and evaluate the temperature curve Tpat(t) and to determine the cardiovascular parameter of the patient from the relation of T2up(t), T2down(t)1 and Tpat(t). The term "downstream of the ECBTD" refers to a place within the patient's vascular system receiving blood from the ECBTD via the efferent line (i.e. after the respective treatment, e.g. oxygenated blood after ECMO treatment). Preferably, the place within the patient's vascular system is located in an arterial compartment downstream of the ECBTD, e.g. the femoral or radial artery in a veno-venous ECBTD set up. Tpat(t) refers to the temperature curve derived from the temperature sensor TSpat located in the patient's vascular system downstream of the ECBTD. Preferably, Tpat(t) is a transpulmonary thermodilution curve, obtained by measuring the time function of a temperature deviation traveling from the venous compartment across the pulmonary circulation to a place of measurement located in an arterial compartment of the patient's vascular system, e.g. the femoral artery or the radial artery. In the system according to the invention comprising TS2up, T2Sdown and Tpat, the cardiovascular parameter may be determined from the relation of T2up(t) and T2down(t)2, as described above, wherein the temperature curve Tpat(t) may be used for correcting the cardiovascular parameter calculated by the relation of T2up(t) and T2down(t)2.

In a preferred implementation, the temperature changing means may induce periodically a controlled temperature change in the first circuit of the ECBTD. For example, the periodical temperature change may be a periodical temperature bolus, analogous to a temperature bolus used with TD or TPTD. In a further preferred implementation, the temperature changing means generate a temperature bolus. Preferably, the temperature change induced in the first circuit of the ECBTD is a controlled decrease in temperature, e.g. a deviation from the blood temperature of the patient towards room temperature. Preferably an aqueous medium, e.g. water, is used as a heat transfer medium in the second circuit. During extracorporeal blood treatment, the treatment device usually keeps blood temperature at regular body temperature or even lower (due to the cooling capacity of the ECBTD's internal heat exchanger for e.g. neural protection). The system according to the present invention, however, also may be used in conjunction with an ECBTD without cooling capacity. In the present system, the temperature in the heat transfer medium in the second circuit preferably deviates from the temperature in the first circuit for the duration of the temperature change, e.g. a bolus, by 1° to 20° C., preferably by 3° to 17° C., more preferred by 5° to 15° C., depending on the blood flow through the ECBTD, and the liquid flow through the second circuit. During the application of a temperature lower than the temperature of the blood in the ECBTD and thus in the patient's vascular system, the impact on the overall temperature differential of thermal losses due to transfer of heat between different parts of the ECBTD can be well estimated and minimized relative to the controlled temperature deviation, allowing for improved accuracy in the subsequent determination of the cardiovascular parameters.

In a preferred embodiment, the computer system may be adapted to control at least one pump in the second circuit, wherein said at least one pump in the second circuit is connected to the temperature changing means, such that the speed of the pump in the second circuit is adapted to generate a steep temperature differential. The term "temperature differential" relates to the temperature difference between the heat transfer media of the first and second circuit within the heat exchanger, in particular across the heat exchange surface. In a more preferred embodiment, the at least one pump in the second circuit may be arranged upstream of the heat exchanger. Preferably, the least one pump in the second circuit may run at higher speed or, if necessary with relatively low blood flows in the first circuit (i.e. <1 L/m), with a higher flow rate compared to the at least one pump in the first circuit of the ECBTD. The computer system according to the invention may be adapted to read out data from the at least one pump in the first circuit, such as the speed, or read out data from a flow sensor connected to the first circuit, such that the speed of the at least one pump in the second circuit, and, in consequence, the flow rate of the fluid circulating therein, may be adjusted automatically in order to obtain a steep temperature differential between the two circuits. In case of continuous flow measurement in systems with a set rotation rate for the first circuit, this measured flow may also be used as input.

In a further implementation of the system according to the invention, the temperature changing means may be arranged downstream of the at least one pump in the first circuit. The term "downstream" herein refers to the arrangement of the at least one pump in relation to the direction of flow in the first circuit. Advantageously, the traveling temperature deviation induced in the first circuit by the temperature changing means is propagated quickly in the first circuit.

In a further embodiment, the temperature changing means may comprise switching means for switching between at least two different temperatures. If the temperature changing means are e.g. arranged as a water bath comprising at least two reservoirs containing water of different temperatures, the reservoir with the desired temperature may be connected to the second circuit by means of the switching means. Alternatively, in the case of the temperature changing means being arranged as a Peltier element, the switching means may serve as switch for connecting the temperature changing means or the cooled/heated part of the second circuit to the heat exchanger, or to connect the heat exchanger to the first circuit. In another embodiment, the switching means may serve as an on/off switch for the temperature changing means. In a particularly advantageous embodiment, the switching means are arranged to switch between at least two different fluid filled reservoirs. In this embodiment, each reservoir is comprising a liquid of a specific temperature and the switching means may switch between a reservoir holding a liquid a temperature corresponding to the temperature in the first circuit and a reservoir holding a liquid having a temperature deviating from that temperature by 1° to 20° C., preferably by 3° to 17° C., more preferred by 5° to 15° C.

In a further implementation of the system according to the invention, the ECBTD may be a device for extracorporeal membrane oxygenation (ECMO). In a particularly preferred embodiment, the temperature changing means may be comprised in an oxygenator of the ECMO, such that a close spatial relationship between the blood treatment membrane and the heating unit of the oxygenator is established. This is advantageous in order to keep the dimensions of the ECMO a small as possible.

In a preferred implementation of the system, the temperature changing means may be connected externally to a heating unit of the ECBTD. For example, temperature changing means designed as a Peltier element can be connected easily to the respective inlets or outlets of the heating unit of the ECBTD or even to the efferent line downstream of the oxygenator.

In a further embodiment the pump of the ECBTD may provide for a flow rate of >200 ml/min; wherein the pump refers to the at least one first pump. More preferred, the pump may provide for a flow rate of >300 ml/min, in particular, if the extracorporeal blood treatment device is a carbon dioxide removal or membrane oxygenation (ECMO) device, which regularly comprises one pump in the first circuit.

In another implementation, the system may additionally comprise a temperature sensor TS1up arranged in the afferent line of the first circuit of the ECDB upstream of the heat exchanger, wherein the computer system is connected to the temperature sensor TS1up and adapted to record the temperature from temperature sensor TS1up as a function of time and to evaluate a temperature curve T1up(t) in order to determine a temperature deviation $T_{ECBTD}$ associated with the ECBTD. In a particularly preferred implementation, the computer system may be adapted to compute a relation of T2up(t), T2down(t), $T_{ECBTD}$(t) and Tpat(t) in order to determine the cardiac output. Particularly in the cases where the ECBTD is a vvECMO device, requiring high flow rates, recirculation of the traveling temperature deviation from the efferent line into the afferent line may constitute a problem hampering the accuracy of cardiovascular parameter determination by TPTD. Thus, the proportion of recirculating blood affecting the Tpat(t) may be determined by relating T1up(t), T2up(t) and T2down(t) in order to derive $T_{ECBTD}$, the temperature deviation associated with the ECBTD. The fraction of recirculating blood, however, may also be estimated from readings of the temperature sensor in the second circuit, which is most closely situated to the afferent line of the ECBTD, in the present case TS2down. Depending on the flow rate in the first circuit, recirculation of a traveling temperature change may be detected on a different timescale (e.g. much earlier) compared to the temperature change detected by the temperature sensor TSpat. Accounting for recirculation enables a more accurate determination of the cardiovascular parameter by computing a relation of T2up(t) T2down(t), and Tpat(t).

Thus, the system according to the invention advantageously enables the efficient detection and correction of an indicator loss due to the extracorporeal circuit, such that errors in the determination of cardiovascular parameters, e.g. of CO, during extracorporeal blood treatment, e.g. during ECMO treatment, may be minimized. Particularly in ECBTD operating with high flow rates, such as ECMO, the system of the invention can increase the accuracy of the cardiovascular parameters determined, because the possible loss of the indicator (e.g. the traveling temperature deviation) caused by these devices is accurately and effectively detected in the corresponding device and subsequently corrected. It thus increases the accuracy and reliability of the determination of these parameters in critically ill patients undergoing extracorporeal blood treatment. The system according to the invention may be used independently of the arrangement/flow direction of the respective extracorporeal blood treatment device and is therefore versatile. On one side, the coupling of the extracorporeal blood treatment device with the patient may be improved and on the other, operational settings of the ECBTD may be adapted optimally to the patient's cardiovascular condition.

In a further embodiment of the system according to the invention, the cardiovascular parameter may be cardiac output (CO), extravascular lung water (EVLW), global enddiastolic volume (GEDV) or systemic organ perfusion and indices derived therefrom.

In a second aspect, the invention relates to a method of determining a cardiovascular parameter utilizing the system according to the invention as described above, the method comprising the steps of inducing in the first circuit of the ECBTD a temperature change, the temperature deviation for inducing the temperature change being generated by the temperature changing means in the second circuit, the first circuit of the ECBTD being thermally coupled to the second circuit via a heat exchanger. The following step includes detecting a temperature T2up in the second circuit by means of temperature sensor TS2up arranged in the second circuit upstream of the heat exchanger, and detecting a temperature T2down in the second circuit by means of temperature sensor TS2down arranged in the second circuit downstream of the heat exchanger. Subsequently, the time-dependent change of the temperature is determined by computing a relation of T2up(t) and T2down(t)1, wherein T2down(t)1 is derived from temperature data measured by TS2down at a first time, and the cardiovascular parameter of the patient is determined from a relation of T2up(t) and T2down(t)2, wherein T2down(t)2 is derived from temperature data measured by TS2down at a second time.

In a preferred implementation of the method, additional steps may be included, wherein a local temperature Tpat of the patient's blood may be detected by means of a temperature sensor TSpat arranged at a place of the patient's vascular system downstream of the ECBTD, and wherein the cardiovascular parameter of the patient may be determined from the relation of T2up(t), T2down(t)1 and Tpat(t).

In a third aspect, the invention relates to a computer system adapted to working in conjunction with a system for determining a cardiovascular parameter as described above, wherein the computer system comprises connecting means for connecting the computer system to temperature sensors TS2up and TS2down and to the temperature changing means, and access means for accessing executable instructions for causing the computer system to control the temperature changing means in the second circuit in order to generate a controlled change in the temperature in the second circuit, and further to monitor temperatures T2up and T2down as a function of time as measured by temperature sensors TS2up and TS2down, and determine the respective temperature curves T2up(t) and T2down(t), and further to compute a relation of T2up(t) and T2down(t)1 in order to determine the characteristics of the time-dependent change of the temperature generated by the temperature changing means, wherein T2down(t)1 is derived from temperature data measured by TS2down at a first time, and to determine the cardiovascular parameter of the patient from a relation of T2up(t) and T2down(t)2, wherein T2down(t)2 is derived from temperature data measured by TS2down at a second time.

In a fourth aspect, the invention relates to a non-volatile, computer readable storage medium having stored data representing instructions for determining a cardiovascular parameter in a system as described above, wherein the instructions are readable by a computer system for causing the computer system to control the temperature changing means in the second circuit in order to generate a controlled temperature change in the second circuit, and further to record temperatures T2up and T2down, measured with sensors TS2up and TS2down as a function of time and determine the respective temperature curves T2up(t), and T2down(t), and further to compute a relation of T2up(t) and T2down(t)1 in order to determine the characteristics of the time-dependent change of the temperature generated by the temperature changing means, wherein T2down(t)1 is derived from temperature data measured by TS2down at a first time, and to determine the cardiovascular parameter of the patient from a relation of T2up(t) and T2down(t)2, wherein T2down(t)2 is derived from temperature data measured by TS2down at a second time.

Hereinafter, a particularly preferred embodiment of the present invention will be explained in more detail with reference to the accompanying FIGURE, to which the invention is not limited, however. In principle, any alternative embodiment of the invention as described or indicated in the context of the present application may be particularly advantageous, depending on economic circumstances, and/or technical and possibly medical conditions. Unless stated otherwise, or as far as technically feasible, individual features of the embodiments described are interchangeable or may be combined with one another and with features known per se from the prior art.

BRIEF DESCRIPTION OF THE FIGURE

The drawing is purely schematic and, for the sake of clarity, not to scale. In particular, ratios between dimensions, especially diameter, length of lines etc. may differ. In practice, dimensions may be selected according to the requirements of the individual case or according to the dimensions of common standard parts.

FIG. 1 shows a schematic overview of the system according to the invention in cooperation with an extracorporeal blood treatment device, the interaction with the vascular system of a patient being shown for illustrative purposes.

DETAILED DESCRIPTION

FIG. 1 shows a schematic overview of the system according to the invention in cooperation with an extracorporeal blood treatment device (ECBTD). As an example for an ECBTD, FIG. 1 depicts an extracorporeal membrane oxygenator (ECMO), which is connected to the patient's circulatory system in a veno-venous configuration (vvECMO). An efferent line (11) conducts deoxygenated blood from the inferior caval vein to the ECMO device and an afferent line (12) returns oxygenated blood to the patient circulatory system via the superior caval vein. Regularly, both major veins are accessed via cannulation of the femoral veins in a patient. The ECMO may also be set up in other configurations, such as veno-arterial (vaECMO) or arteriovenous (avECMO). The ECMO comprises a pump (13) and a flow sensor (18) arranged in the first circuit between the afferent line (11) and the efferent line (12). The system comprises a liquid-filled, second circuit, which is thermally connected to the first circuit of the ECMO via a heat exchanger (14). As shown, the heat exchanger (14) operates by indirect transfer of thermal energy: both fluid-filled circuits are separated by an interface that prevents mixing of the patient's blood circulating in the first circuit of the ECMO with the thermal energy transfer medium, which usually is water or a comparable fluid, circulating in the second circuit. The heat exchanger may operate in any of the flow arrangements known from the art (parallel flow, counter-flow, cross-flow, diffuse flow). The exemplary heat exchanger operates in a preferred counter-flow mode with fluids entering the exchanger from opposite ends: the direction of flows in the first and second circuit is indicated by the arrows adjacent to the circuit lines. The temperature changing means (15) are arranged within the fluid-filled, second circuit. The temperature changing means may be of any variety known in the state-of-the-art; the two fluid-filled reservoirs depicted in FIG. 1 serve as an example for temperature changing means adapted to be switched between two fluids in circuit 2 with different temperatures. While the temperature of one reservoir may be close to the temperature of the patient's blood circulating in the first circuit of the ECMO (here: 38° C.), the second reservoir (151) is filled with cold fluid (25° C.) to be used for generating a controlled lower temperature in the second circuit. The movement of the fluid in the second circuit is generated by pump (17), which in the depicted example is located upstream with respect to the heat exchanger (14). By monitoring and controlling parameters of the pump (17) in the second circuit, such as e.g. speed and/or flow rate, relative to the flow detected by flow sensor (18) in the first circuit, the computer system (40) according to the invention can control the temperature changes in the second circuit generated by the temperature changing means and indirectly of the temperature changes induced in the first circuit of the ECMO, as explained below. The system further comprises a temperature sensor TS2up arranged in the second circuit upstream of the heat exchanger, and a temperature sensor TS2down arranged in the second circuit downstream of the heat exchanger, as well as a temperature sensor TSpat for measuring the local temperature of the patient's blood at a suitable place in the patient's vascular system downstream of the ECMO. As depicted, TSpat is arranged in a vessel of the patient's arterial system, e.g. the femoral artery, in a configuration suitable for TPTD measurements. The terms "downstream" and "upstream" regarding the arrangement of the temperature sensors in the second circuit refer to the respective direction of flow in the second circuit (and also within the associated part of the heat exchanger). The term "downstream of the ECMO" here refers to a place within the patient's arterial system. The system further comprises a computer system (40), comprising a monitor, wherein the computer system (40) is connected to temperature sensors (TS2up, TS2down, TSpat) and the temperature changing means. As shown here, the computer system is connected to switching means (16) which may switch between the two fluid-filled reservoirs of the temperature changing means, such that a temperature change, e.g. a temperature bolus, is generated in the second circuit. Said temperature change in the second circuit induces a traveling temperature deviation in the first circuit via the separating, heat conducting wall of the heat exchanger, i.e. the thermal energy carried by e.g. a cold bolus in the second circuit is transferred to the first circuit via the heat exchanger.

In an ideal heat exchanger there is no temperature gradient across the heat transfer surface; in actual configurations of the system of the present invention, where heat exchange is not impeded by e.g. an interposed gas exchange membrane or the like, heat transfer between the fluid-filled second and the first circuit is considered near complete. The cardiovascular parameter of the patient is subsequently determined by the computer system (40), preferably by TPTD, from analyzing the relation of T2up(t), T2down(t) and Tpat(t). As described above, the cardiovascular parameter may be determined in a system comprising only temperature sensors TS2 up and TS2 down. Here, the computer system is adapted to compute a relation of T2up(t) and T2down(t)1 in order to determine and control the characteristics of the time-dependent changes in the temperature generated by the temperature changing means, wherein T2down(t)1 is derived from temperature data measured by TS2down at a first time. Subsequently, the cardiovascular parameter may be determined from the relation of T2up(t) and T2down(t)2, wherein T2down(t)2 is derived from temperature data measured by TS2down at a second time. The exemplary system additionally comprises temperature sensor TS1up, which is arranged in the afferent line of the first circuit of the ECMO upstream of the heat exchanger (14). The computer system is connected to said temperature sensor TS1up and adapted to record the temperature from temperature sensor TS1up as a function of time to improve calibration, calculation of cardiovascular parameters and recirculation of blood in case of a vvECMO. The computer system (40) is adapted to compute a relation of T2up(t), T2down(t) and Tpat(t) in order to determine the cardiovascular parameter, e.g. cardiac output. Particularly in the cases where the ECBTD is a vvECMO device (shown here), requiring high flow rates, recirculation of the blood will affect the Tpat(t) a problem that may decrease the accuracy of cardiovascular parameter determination by TPTD. Thus, the temperature deviation related to the proportion of recirculation may be determined by relating T1up(t) to T2up(t) and T2down(t) in order to derive $T_{ECBTD}$, the temperature deviation associated with the ECBTD. Accounting for recirculation enables a more accurate determination of the cardiovascular parameter by computing a relation of T2up(t), T2down(t), $T_{ECBTD}$ and Tpat(t). Thus, the system according to the invention advantageously enables the efficient detection and correction of an indicator loss due to the extracorporeal circuit, such that errors in the determination of cardiovascular parameters, e.g. of CO, during extracorporeal blood treatment, e.g. during ECMO treatment, may be minimized.

REFERENCES

Wietasch, G. J., Mielck, F., Scholz, M., Von Spiegel, T., Stephan, H., & Hoeft, A. (2000). Bedside assessment of cerebral blood flow by double-indicator dilution technique. Anesthesiology: The Journal of the American Society of Anesthesiologists, 92(2), 367-367.

REFERENCE NUMERALS 10 extracorporeal blood treatment device, ECBTD
11 afferent line, towards ECBTD
12 efferent line, from ECBTD
13 pump within the first circuit
14 heat exchanger
15 temperature changing means
151 fluid-filled reservoir
16 switching means
17 pump within the second circuit
18 flow sensor, first circuit
40 computer system

The invention claimed is:

1. A system for determining a cardiovascular parameter in a patient, wherein the system is adapted to work in conjunction with an extracorporeal blood treatment device (ECBTD) connectable to a patient's vascular system via an afferent line and an efferent line, wherein the ECBTD comprises a first circuit with at least one pump arranged between the afferent and the efferent line for pumping the blood of the patient, the system comprising:
 a) a liquid-filled, second circuit thermally connected to the first circuit of the ECBTD via a heat exchanger,
 b) a temperature changing device for generating a controlled temperature change in the second circuit,
 c) a temperature sensor TS2up arranged in the second circuit upstream of the heat exchanger, and a temperature sensor TS2down arranged in the second circuit downstream of the heat exchanger,
 d) a computer system connected to the temperature sensors TS2up and TS2down and to the temperature changing device, which is adapted to induce a temperature change within the first circuit of the ECBTD via the temperature changing device, to record each temperature as a function of time and to evaluate the respective temperature curves T2up(t) and T2down(t), wherein the computer system is further adapted to compute a relation of T2up(t) and T2down(t)1 in order to determine and control the characteristics of the time-dependent changes in the temperature generated by the temperature changing device, wherein T2down(t)1 is derived from temperature data measured by TS2down in a first time frame, and to determine the cardiovascular parameter of the patient from the relation of T2up(t) and T2down(t)2), wherein T2down(t)2 is derived from temperature data measured by TS2down in a second time frame that is different from the first time frame.

2. The system according to claim 1, further comprising a temperature sensor TSpat for measuring a local temperature of the patient's blood at a place of the patient's vascular system downstream of the ECBTD, wherein the computer system is further connected to TSpat and further adapted to record a temperature Tpat as a function of time and to evaluate a temperature curve Tpat(t), and to determine the cardiovascular parameter of the patient from a relation of T2up(t), T2down(t)1 and Tpat(t).

3. The system according to claim 1, wherein the temperature changing device induces periodically a second controlled temperature change in the first circuit of the ECBTD.

4. The system according to claim 1, wherein the temperature changing device generates a temperature bolus.

5. The system according to claim 1, wherein the computer system is adapted to control at least one pump in the second circuit, wherein said at least one pump in the second circuit is connected to the temperature changing device, such that a speed of the at least one pump in the second circuit is adapted to generate a temperature differential above a threshold.

6. The system according to claim 5, wherein the at least one pump in the second circuit is arranged upstream of the heat exchanger.

7. The system according to claim 1, wherein the temperature changing device is arranged downstream of the at least one pump in the first circuit.

8. The system according to claim 1, wherein the temperature changing device is configured to switch between at least two different temperatures.

9. The system according to claim 8, wherein the temperature changing device is configured to switch between at least two different fluid-filled reservoirs.

10. The system according to claim 1, wherein the ECBTD is an extracorporeal membrane oxygenator (ECMO) device.

11. The system according to claim 10, wherein the temperature changing device is comprised in an oxygenator of the ECMO.

12. The system according to claim 1, wherein the at least one pump provides for a flow rate of >200 ml/min.

13. The system according to claim1, further comprising a temperature sensor TS1up arranged in the afferent line of the first circuit of the ECBTD upstream of the heat exchanger, wherein the computer system is connected to the temperature sensor TS1up and adapted to record the temperature from temperature sensor TS1up as a function of time and to evaluate a temperature curve T1up(t) in order to determine a temperature deviation TECBTD associated with the ECBTD.

14. The system according to claim 13, wherein the computer system is adapted to compute a relation of T2up(t), T2down(t), TECBTD and Tpat(t) in order to determine a cardiac output.

15. The system according to claim 1, wherein the cardiovascular parameter is cardiac output (CO), extravascular lung water (EVLW), global enddiastolic volume (GEDV) or systemic organ perfusion and indices derived therefrom.

16. A method of determining a cardiovascular parameter utilizing the system according to claim 1, comprising:
a) inducing in the first circuit of the ECBTD the temperature change, a temperature deviation for inducing the temperature change being generated by the temperature changing device in the second circuit, the first circuit of the ECBTD being thermally coupled to the second circuit via a heat exchanger,
b) detecting a temperature T2up in the second circuit by means of temperature sensor TS2up arranged in the second circuit upstream of the heat exchanger, and detecting a temperature T2down in the second circuit by means of temperature sensor TS2down arranged in the second circuit downstream of the heat exchanger,
c) determining the time-dependent changes in the temperature by computing a relation of T2up(t) and T2down(t)1, wherein T2down(t)1 is derived from temperature data measured by TS2down in a first time frame, and determining the cardiovascular parameter of the patient from said relation of T2up(t) and T2down(t)2, wherein T2down(t)2 is derived from temperature data measured by TS2down in a second time frame that is different from the first time frame.

17. The method according to claim 16, further including steps
b') detecting a local temperature Tpat of the patient's blood by means of a temperature sensor TSpat arranged at a place of the patient's vascular system downstream of the ECBTD, and
c') determining the cardiovascular parameter of the patient from a relation of T2up(t) and T2down(t)1 and Tpat(t).

18. A computer system adapted to working in conjunction with a system for determining a cardiovascular parameter according to claim 1, wherein the computer system is configured to connect to temperature sensors TS2up and TS2down and to the temperature changing device, and to access executable instructions for causing the computer system
a) to control a temperature changing device in the second circuit in order to generate the controlled temperature change in the second circuit,
b) to monitor temperatures T2up and T2down, measured by temperature sensors TS2up and TS2down as a function of time and determine the respective temperature curves T2up(t) and T2down(t) and
c) to compute the relation of T2up(t) and T2down(t)1 in order to determine the characteristics of the time-dependent change of the temperature generated by the temperature changing device, wherein T2down(t)1 is derived from temperature data measured by TS2down in a first time frame, and to determine the cardiovascular parameter of the patient from the relation of T2up(t) and T2down(t)2 in a second time frame that is different from the first time frame.

19. A non-transitory, computer readable storage medium having stored thereon data representing instructions for determining a cardiovascular parameter in a system according to claim 1, wherein the instructions are readable by a computer system for causing the computer system to execute the steps comprising:
  a) to control the temperature changing device in the second circuit in order to generate a controlled temperature change in the second circuit,
  b) to monitor temperatures T2up, and T2down measured with temperature sensors TS2up and TS2down, as a function of time (t) and determine the respective temperature curves T2up(t), T2down(t), and
  c) to compute a relation of T2up(t) and T2down(t)1 in order to determine the characteristics of the time-dependent change of the temperature generated by the temperature changing device, wherein T2down(t)1 is derived from temperature data measured by TS2down in a first time frame, and to determine the cardiovascular parameter of the patient from a relation of T2up(t) and T2down(t)2, wherein T2down(t)2 is derived from temperature data measured by TS2down in a second time frame that is different from the first time frame.

* * * * *